(12) United States Patent
Fortunato et al.

(10) Patent No.: US 11,836,630 B2
(45) Date of Patent: *Dec. 5, 2023

(54) TRAINING NEURAL NETWORKS USING POSTERIOR SHARPENING

(71) Applicant: DeepMind Technologies Limited, London (GB)

(72) Inventors: Meire Fortunato, London (GB); Charles Blundell, London (GB); Oriol Vinyals, London (GB)

(73) Assignee: DeepMind Technologies Limited, London (GB)

( * ) Notice: Subject to any disclaimer, the term of this patent is extended or adjusted under 35 U.S.C. 154(b) by 490 days.

This patent is subject to a terminal disclaimer.

(21) Appl. No.: 17/024,217

(22) Filed: Sep. 17, 2020

(65) Prior Publication Data

US 2021/0004689 A1 Jan. 7, 2021

Related U.S. Application Data

(63) Continuation of application No. 16/511,496, filed on Jul. 15, 2019, now Pat. No. 10,824,946, which is a (Continued)

(51) Int. Cl.
G06N 3/084 (2023.01)
G06N 3/044 (2023.01)
G06N 3/047 (2023.01)

(52) U.S. Cl.
CPC .............. *G06N 3/084* (2013.01); *G06N 3/044* (2023.01); *G06N 3/047* (2023.01)

(58) Field of Classification Search
None
See application file for complete search history.

(56) References Cited

U.S. PATENT DOCUMENTS 6,128,606 A 10/2000 Bengio
2020/0005152 A1 1/2020 Blundell et al.

FOREIGN PATENT DOCUMENTS

CN 106056213 10/2016
CN 106462801 2/2017

OTHER PUBLICATIONS

Amodei et al., "Deep speech 2: End-to-end speech recognition in English and Mandarin" arXiv, Dec. 2015, 28 pages.
(Continued)

*Primary Examiner* — Ann J Lo
*Assistant Examiner* — Fen Christopher Tamulonis
(74) *Attorney, Agent, or Firm* — Fish & Richardson P.C.

(57) ABSTRACT

Methods, systems, and apparatus, including computer programs encoded on a computer storage medium, for training a neural network. In one aspect, a method includes maintaining data specifying, for each of the network parameters, current values of a respective set of distribution parameters that define a posterior distribution over possible values for the network parameter. A respective current training value for each of the network parameters is determined from a respective temporary gradient value for the network parameter. The current values of the respective sets of distribution parameters for the network parameters are updated in accordance with the respective current training values for the network parameters. The trained values of the network parameters are determined based on the updated current values of the respective sets of distribution parameters.

20 Claims, 5 Drawing Sheets

Related U.S. Application Data continuation of application No. PCT/EP2018/057418, filed on Mar. 23, 2018.

(60) Provisional application No. 62/475,794, filed on Mar. 23, 2017.

(56) References Cited

OTHER PUBLICATIONS

Andrychowicz et al., "Learning to learn by gradient descent by gradient descent" arXiv, Nov. 2016, 17 pages.
Anoop et al. "Bayesian Dark Knowledge" arxiv [Published 2015] [Retrieved Jan. 2020] <URL: https://arxiv.org/pdf/1506.04416.pdf>.
Bayer et al., "Learning stochastic recurrent networks" arXiv, Mar. 2015, 9 pages.
Beal, "Variational algorithms for approximate Bayesian inference" University of London United Kingdom, May 2003, 281 pages.
Blundell et al., "Weight Uncertainty in Neural Networks", Proceedings of Machine Learning Research, Jul. 7, 2015, 10 pages.
Britz, "Recurrent Neural Networks Tutorial, Part 1—Introduction to RNNs" retrieved from the internet: URL <https://web.archive.org/web/20151006181643.http://www.wildml.com:80/2015/09/recurrent-neural-networks-tutorial-part-1-introduction-to-rnns>, [retrieved on Jun. 25, 2018, 8 pages.
Buntine et al., "Bayesian back-propagation" Complex Systems, 1991, 39 pages.
Chien et al., "Bayesian recurrent neural network for language modeling" IEEE Transactions on Neural Networks and Learning Systems, 2015, 14 pages.
Chung et al., "A recurrent latent variable model for sequential data" Advances in neural information processing systems, 2015, 9 pages.
Denker et al., "Transforming neural-net output levels to probability distributions" Advances in neural information processing systems, 1991, 7 pages.
Duchi et al., "Adaptive subgradient methods for online learning and stochastic optimization" Journal of Machine Learning Research, Jul. 2011, 39 pages.
EP Office Action in European Appln. No. 18713866.4, dated Aug. 11, 2020, 12 pages.
Fabius et al., "Variational recurrent auto-encoders" arXiv, Jun. 2015, 5 pages.
Gal et al., "A theoretically grounded application of dropout in recurrent neural networks" arXiv, Oct. 2016, 14 pages.
Gal et al., "Dropout as a Bayesian approximation: Representing model uncertainty in deep learning" arXiv, Oct. 2016, 12 pages.
Gan et al., "Scalable Bayesian learning of recurrent neural networks for language modeling" arXiv, Apr. 2017, 11 pages.
Graves, "Practical variational inference for neural networks" Advances in Neural Information Processing Systems, 2011, 9 pages.
Graves, "Stochastic backpropagation through mixture density distributions" arXiv, Jul. 2016, 6 pages.
Hasenclever et al., "Distributed Bayesian learning with stochastic natural gradient expectation propagation and the posterior server" arXiv, Sep. 2017, 37 pages.
Hernandez-Lobato et al., "Probabilistic backpropagation for scalable learning of Bayesian neural networks" arXiv, Jul. 2015, 15 pages.
Hinton et al., "Keeping the neural networks simple by minimizing the description length of the weights" Proceedings of the sixth annual conference on Computational learning theory, 1993, 9 pages.
Hochreiter et al., "Long short-term memory" Neural computation, 1997, 32 pages.
Hochreiter et al., "Simplifying neural nets by discovering flat minima" Advances in Neural Information Processing Systems, 1995, 8 pages.
Houthooft et al., "Curiosity-driven exploration in deep reinforcement learning via Bayesian neural networks" arXiv, May 2016, 11 pages.
Jin et al., "Inverse Reinforcement Learning via Deep Gaussian Process," https://arxiv.org/abs/1512.08065v1, Dec. 2015, 7 pages.
Jozefowicz et al., "Exploring the limits of language modeling" arXiv, Feb. 2016, 11 pages.
Kim et al., "Character-aware neural language models" arXiv, Dec. 2015, 9 pages.
Kingma et al., "Adam: A method for stochastic optimization" arXiv, Jan. 2017, 15 pages.
Kingma et al., "Auto-encoding variational Bayes" arXiv, May 2014, 14 pages.
Kingma et al., "Variational dropout and the local reparameterization trick" arXiv, Dec. 2015, 14 pages.
Li et al., "Learning to optimize" arXiv, Jun. 2016, 9 pages.
Li et al., "Preconditioned stochastic gradient Langevin dynamics for deep neural networks" arXiv, Dec. 2015, 12 pages.
Lin et al., "Microsoft coco: Common objects in context" arXiv, Feb. 2015, 15 pages.
Lipton et al., "Efficient exploration for dialogue policy learning with BBQ networks & replay budder spiking" arXiv, Nov. 2017, 8 pages.
Liu et al., "Optimization of image description metrics using policy gradient methods" arXiv, Dec. 2016, 10 pages.
Lu et al., "Knowing when to look: Adaptive attention via a visual sentinel for image captioning" arXiv, Jun. 2017, 12 pages.
MacKay, "Probable networks and plausible predictions a review of practical Bayesian methods for supervised neural networks" Network: Computation in Neural Systems, 1995, 37 pages.
Mahsereci et al., "Probabilistic line searches for stochastic optimization" Journal of Machine Learning Research, Nov. 2017, 59 pages.
Marcus et al., "Building a large annotated corpus of English: The Penn Treebank" Computational linguistics, 1993, 18 pages.
Merity et al., "Pointer Sentinel Mixture Models" arXiv, Sep. 2016, 13 pages.
Mikolov et al., "Recurrent neural network based language model" Interspeech, 2010, 4 pages.
Mirikitani et al., "Recursive bayesian recurrent neural networks for timeseries modeling" IEEE Transactions on Neural Networks, Feb. 2010, 13 pages.
Neal, "Bayesian learning for neural networks" Thesis for the degree of Doctor of Philosophy, University of Toronto, Mar. 1995, 195 pages.
PCT International Preliminary Report on Patentability in International Appln. No. PCT/EP2018/057418, dated Sep. 24, 2019, 10 pages.
PCT International Search Report and Written Opinion in International Application No. PCT/EP2018/057418, dated Jul. 4, 2018, 16 pages.
Ranganath et al., "Hierarchical variational models" arXiv, May 2016, 13 pages.
Rezende et al., "Stochastic backpropagation and approximate inference in deep generative models" arXiv, May 2014, 14 pages.
Soudry et al., "Expectation backpropagation: Parameter-free training of multilayer neural networks with continuous or discrete weights" Advances in Neural Information Processing Systems, 2014, 9 pages.
Srivastava et al., "Dropout: a simple way to prevent neural networks from overfitting" Journal of Machine Learning Research, Jul. 2014, 30 pages.
Sutskever, Training recurrent neural networks:, retrieved from the internet: URL <https://tspace.library.utoronto.ca/handle/1807/36012?mode=full>, [retrieved on Jun. 25, 2018], 11 pages.
Turner et al., "Two problems with variational expectation maximization for time-series models" Bayesian Time Series Models, 2011, 21 pages.
Vinyals et al., "Show and tell: Lessons learned from the 2015 mscoco image captioning challenge" arXiv, Sep. 2016, 12 pages.
Wainwright et al., "Graphical models, exponential families, and variational inference" Foundations and Trends in Machine Learning, 2008, 305 pages.
Wang et al., "Fast dropout training" ICML, 2013, 9 pages.
Welling et al., "Bayesian learning via stochastic gradient Langevin dynamics" Proceedings of the 28th International Conference on Machine Learning, 2011, 8 pages.

(56) References Cited

OTHER PUBLICATIONS

Wu et al., "Google's neural machine translation system: Bridging the gap between human and machine translation" arXiv, Oct. 2016, 23 pages.
Zaremba et al., "Recurrent neural network regularization" arXiv, Feb. 2015, 8 pages.
Zilly et al., "Recurrent highway networks" arXiv, Jul. 2017, 12 pages.
Office Action in European Appln. No. 18713866.4, dated Feb. 24, 2021, 13 pages.
Notice of Allowance in Chinese Appln. No. 201880016417.3, dated Jun. 26, 2023, 10 pages (with English translation).

TRAINING NEURAL NETWORKS USING POSTERIOR SHARPENING

CROSS-REFERENCE TO RELATED APPLICATION

This application is a continuation of U.S. patent application Ser. No. 16/511,496, filed Jul. 15, 2019, which is a continuation of International Application No. PCT/EP2018/057418, filed Mar. 23, 2018, which claims the benefit under 35 U.S.C. 119 of Provisional Application No. 62/475,794, filed Mar. 23, 2017, both of which are incorporated by reference.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that performs neural network training.

According to a first aspect there is provided a method for neural network training of a neural network having a plurality of network parameters to determine trained values of the network parameters. The neural network is configured to receive a network input and to process the network input in accordance with the network parameters to generate a network output. Data is maintained that specifies, for each of the network parameters, current values of a respective set of distribution parameters that define a posterior distribution over possible values for the network parameter. A respective temporary parameter value is determined for each of the network parameters from the current values of the respective set of distribution parameters for the network parameter. A mini-batch including a plurality of training network inputs and, for each training network input, a respective training network output, is obtained. A respective temporary gradient value is determined for each of the network parameters by determining a gradient of an objective function for the mini-batch and with respect to the respective temporary parameter values. A respective current training value is determined for each of the network parameters from the respective temporary gradient value for the network parameter. The current values of the respective sets of distribution parameters for the network parameters are updated in accordance with the respective current training values for the network parameters. Trained values of the network parameters are determined based on the updated current values of the respective sets of distribution parameters.

In some implementations, updating the current values of the respective sets of distribution parameters for the network parameters includes determining a respective training gradient value with respect to each of the distribution parameters of an augmented objective function that includes a first term that is derived from the objective function. The current values of the respective sets of distribution parameters for the network parameters are updated using the respective training gradient values.

In some implementations, the augmented objective function includes a second term that is derived from a divergence between the current training values under the posterior distribution and under a prior distribution.

In some implementations, the augmented objective function includes a third term that is derived from a divergence between the temporary parameter values under the posterior distribution and under a prior distribution.

In some implementations, the neural network is a feedforward neural network.

In some implementations, determining the respective temporary gradient values includes performing an iteration of a stochastic gradient descent with a backpropagation training procedure on the mini-batch with the values of the network parameters set to the temporary parameter values. Determining the respective training gradient values includes performing an iteration of the stochastic gradient descent with backpropagation training procedure with the values of the network parameters set to the current training values.

In some implementations, the neural network is a recurrent neural network, and each network input is a sequence comprising a respective time step input at each of multiple time steps.

In some implementations, determining the respective temporary gradient values includes performing an iteration of a backpropagation through time training procedure with the values of the network parameters set to the temporary parameter values. Determining the respective training gradient values includes performing an iteration of the backpropagation through time training procedure with the values of the network parameters set to the current training values.

In some implementations, training network inputs in the mini-batch are truncated network inputs. Determining the respective temporary gradient values includes performing an iteration of a truncated backpropagation through a time training procedure with the values of the network parameters set to the temporary parameter values. Determining the respective training gradient values includes performing an iteration of the truncated backpropagation through time training procedure with the values of the network parameters set to the current training values.

In some implementations, the distribution parameters include a mean parameter and a standard deviation parameter for each of the network parameters. Determining a respective temporary parameter value for each of the network parameters from the current values of the set of distribution parameters for the network parameter includes sampling the temporary parameter value from a distribution having a mean defined by the current value of the mean parameter for the network parameter and a standard deviation defined by the current value of the standard deviation parameter for the network parameter.

In some implementations, the distribution parameters include a learning rate parameter for each of the network parameters. Determining a respective current training value for each of the network parameters from the respective temporary gradient value for the network parameter includes determining a distribution mean for the network parameter from the temporary parameter value for the network parameter, the current value of the learning rate parameter for the network parameter, and the temporary gradient value for the network parameter. A current training value for the parameter is sampled from a distribution having the distribution mean and a predetermined standard deviation.

In some implementations, the trained values of the network parameters are stored.

In some implementations, the trained values of the network parameters are provided for use in processing network inputs using the trained neural network.

According to a second aspect there is provided a method for neural network training of a neural network having a plurality of network parameters to determine trained values of the network parameters. The neural network is configured to receive a network input and to process the network input in accordance with the network parameters to generate a network output. Data is maintained that specifies, for each of the network parameters, current values of a respective set of distribution parameters that define a posterior distribution over possible values for the network parameter. A respective temporary parameter value is determined for each of the network parameters from the current values of the set of distribution parameters for the network parameter. A minibatch is obtained including a plurality of training network inputs and, for each training network input, a respective training network output. A respective temporary gradient value is determined for each of the network parameters by determining a gradient of an objective function for the minibatch and with respect to the respective temporary parameter values. A respective current training value is determined for each of the network parameters from the respective temporary gradient value for the network parameter. The neural network is trained on the minibatch in accordance with the respective current training values for the network parameters to update the current values of the respective sets of distribution parameters for the network parameters.

In some implementations, training the neural network on the minibatch in accordance with the respective training values includes determining a respective training gradient value with respect to each of the distribution parameters of an augmented objective function that includes a first term that is derived from the objective function. The current values of the respective sets of distribution parameters for the network parameters are updated using the respective training gradient values.

According to a third aspect, there is provided a system comprising one or more computers and one or more storage devices storing instructions that when executed by the one or more computers cause the one or more computers to perform the operations of a method as described above.

According to a fourth aspect, there is provided a computer program product (such as one or more storage media) storing (e.g. in non-transitory form) program instructions that when executed by one or more computers cause the computers to perform a method as described above.

According to a fifth aspect, there is provided one or more computer storage media storing instructions that when executed by one or more computers cause the one or more computers to perform the operations of a method as described above.

Particular embodiments of the subject matter described in this specification can be implemented so as to realize one or more of the following advantages.

The training system as described in this specification may reduce the time and amount of computing resources required to train a neural network to have acceptable performance (e.g., relative to a conventional training system). Moreover, a neural network trained by the training system as described in this specification may have superior performance (e.g., prediction accuracy) relative to neural networks trained by conventional training systems.

The training system as described in this specification learns a distribution (referred to as a posterior distribution) over the network parameters values of the neural network rather than directly learning the network parameter values themselves (as in some conventional training systems). Because the posterior distribution implicitly encodes a measure of uncertainty of the network parameter values of the neural network (e.g., by the values of standard deviation parameters included in the posterior distribution parameters), the measure of uncertainty of the network parameter values of the trained neural network can be made available to users. This can allow users to make better informed decisions about how to use predictions made by the trained neural network. For example, if the predictions made by the neural network are used to select medical treatments to apply to patients, then a user may want to discount predictions made by the trained neural network if the measure of uncertainty of the network parameter values is considered to be unacceptably high.

Some conventional training systems learn a posterior distribution over network parameter values by: (i) sampling network parameter values from the posterior distribution, (ii) determining gradient values based on the sampled network parameter values, and (iii) updating the current parameter values of the posterior distribution using the gradient values. In contrast, the training system as described in this specification samples network parameter values from a sharpened posterior distribution.

For each training iteration, a respective mini-batch of training examples is drawn ("sampled"), such as by a random or pseudo-random process, from a training data database (i.e. each mini-batch is a respective subset of the training examples in the training data database, and is typically a plurality of the training examples), and the sharpened posterior distribution depends on the mini-batch of training examples sampled for the training iteration. Since the sharpened posterior distribution depends on the mini-batch for the training iteration while the posterior distribution does not, the network parameter values sampled from the sharpened posterior distribution may cause the neural network to have better performance (e.g., according to an objective function) than would be the case if the parameter values were sampled from the posterior distribution. Therefore, the gradient values determined based on network parameter values sampled from the sharpened posterior distribution may provide updates for the current parameter values of the posterior distribution that are more stable than would be achieved by using gradient values determined based on network parameter values sampled from the posterior distribution itself (as in some conventional systems). Updates to the parameter values of the posterior distribution are referred to as stable if they consistently result in effective performance (e.g., prediction accuracy) of a neural network with network parameter values that are selected based on the trained values of the posterior distribution parameters. By improving the stability of the training process, the training system as described in this specification results in a more efficient training process and a better-performing trained neural network. Because of the improved stability of the training process, the time and amount of computing resources required to train the neural network to have acceptable performance can be reduced.

By learning a distribution (i.e., the posterior distribution) over the network parameters of the neural network rather than directly learning the network parameter values themselves (as in some conventional training systems), neural networks trained by the training system as described in this specification may exhibit superior generalization performance. The generalization performance of a neural network refers to the capacity of the neural network to achieve acceptable performance (e.g., prediction accuracy) on network inputs that are not included in the training data used to train the neural network. Specifically, the training system as described in this specification learns the posterior distribution based on an augmented objective function that penalizes large differences between: (i) the sharpened posterior distribution and a prior distribution for the sharpened posterior distribution, and (ii) the posterior distribution and a prior distribution for the posterior distribution. By penalizing these differences, the training system as described in this specification improves the generalization performance of the neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
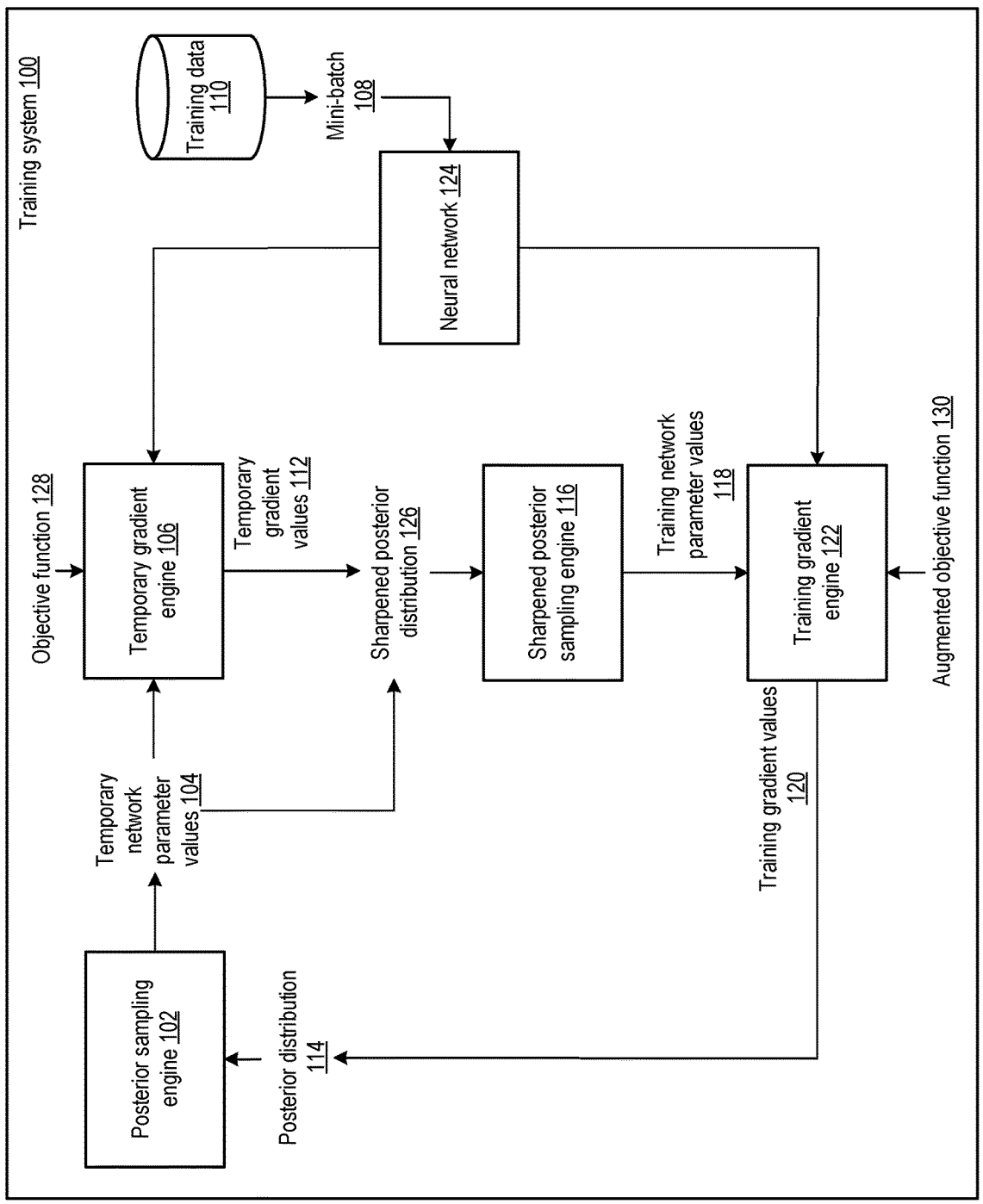
FIG. 1 shows an example training system.

FIG. 1 shows an example training system 100. The training system 100 is an example of a system implemented as computer programs on one or more computers in one or more locations in which the systems, components, and techniques described below are implemented.

The system 100 trains a neural network 124. The neural network 124 can be a feed-forward neural network (e.g., a multi-layer perceptron or a convolutional neural network), a recurrent neural network (e.g., a long short-term memory network), or any other kind of neural network. The neural network 124 can be configured to receive any kind of digital data input and to generate any kind of score, classification, or regression output based on the input. A few examples follow.

For example, if the inputs to the neural network 124 are images or features that have been extracted from images, the output generated by the neural network 124 for a given image may be scores for each of a set of object categories, with each score representing an estimated likelihood that the image contains an image of an object belonging to the category.

As another example, if the inputs to the neural network 124 are Internet resources (e.g., web pages), documents, or portions of documents or features extracted from Internet resources, documents, or portions of documents, the output generated by the neural network 124 for a given Internet resource, document, or portion of a document may be a score for each of a set of topics, with each score representing an estimated likelihood that the Internet resource, document, or document portion is about the topic.

As another example, if the inputs to the neural network 124 are features of an impression context for a particular advertisement, the output generated by the neural network 124 may be a score that represents an estimated likelihood that the particular advertisement will be clicked on.

As another example, if the inputs to the neural network 124 are features of a personalized recommendation for a user, e.g., features characterizing the context for the recommendation, e.g., features characterizing previous actions taken by the user, the output generated by the neural network 124 may be a score for each of a set of content items, with each score representing an estimated likelihood that the user will respond favorably to being recommended the content item.

As another example, if the input to the neural network 124 is a sequence of text in one language, the output generated by the neural network 124 may be a score for each of a set of pieces of text in another language, with each score representing an estimated likelihood that the piece of text in the other language is a proper translation of the input text into the other language.

As another example, if the input to the neural network 124 is a sequence representing a spoken utterance, the output generated by the neural network 124 may be a score for each of a set of pieces of text, each score representing an estimated likelihood that the piece of text is the correct transcript for the utterance.

The system 100 trains the neural network 124 by determining trained values of a set of parameters of a posterior distribution 114. The posterior distribution 114 is a probability distribution over possible values for each of the network parameters of the neural network 124. Once training is complete, trained values of the network parameters of the neural network 124 can be determined from the posterior distribution 114 in any of a variety of ways.

For example, for each network parameter, the system 100 may determine the trained value of the network parameter to be a mean of the posterior distribution 114 over possible values of the network parameter. As another example, the system 100 may sample multiple respective candidate sets of values for the network parameters from the posterior distribution 114. For each candidate set of network parameter values, the system 100 may determine an effectiveness (e.g., a prediction accuracy) of the neural network 124 when it processes network inputs to determine network outputs in accordance with the candidate set of network parameter values. Finally, the system 100 may determine the trained values of the network parameters to be the candidate set of network parameter values that cause the neural network 124 to be most effective.

The system trains the neural network 124 on a set of training data 110. The training data 110 includes multiple training examples. When the neural network 124 is a feedforward neural network, each training example includes a network input and a corresponding target output. The target output for a network input is a network output that should be generated by the neural network 124 in response to processing the network input. When the neural network 124 is a recurrent neural network, each training example includes a sequence of network inputs and corresponding target outputs. In some cases (e.g., for reasons of computational efficiency during training), for each training example, the sequence of network inputs and corresponding target outputs included in the training example is a truncation (i.e., a subsequence) of a longer sequence of network inputs and corresponding target outputs.

The system 100 maintains (e.g., in a logical data storage area or a physical data storage device) numerical data specifying current values of the posterior distribution parameters of the posterior distribution 114. For each network parameter of the neural network 124 there is a respective set of one or more posterior distribution parameters. The posterior distribution parameters include, for each network parameter of the neural network 124, respective posterior distribution parameters that define a probability distribution over possible values for the network parameter. For example, the respective posterior distribution parameters for each network parameter may include a mean parameter and a standard deviation parameter (e.g., of a Gaussian distribution).

At each training iteration, the system uses the posterior distribution 114 (i.e., as characterized by the current values of the posterior distribution parameters) to determine a sharpened posterior distribution 126, as will be described in more detail later. The posterior distribution parameters also include, for each network parameter, a learning rate parameter that reflects how different the sharpened posterior distribution parameter values of the sharpened posterior distribution 126 may be from the posterior distribution parameter values of the posterior distribution 114.

The system 100 also maintains data defining a sharpened posterior distribution 126, which (similar to the posterior distribution 114) is a probability distribution over possible values for each network parameter of the neural network 124. The sharpened posterior distribution 126 is defined by current values of sharpened posterior distribution parameters. The sharpened posterior distribution parameters include, for each network parameter of the neural network 124, respective sharpened posterior distribution parameters that define a probability distribution over possible values for the network parameter. For example, the respective sharpened posterior distribution parameters for each network parameter may include a mean parameter and a standard deviation parameter (e.g., of a Gaussian distribution).

The system 100 trains the neural network 124 over multiple training iterations. At each training iteration, the system 100 obtains a mini-batch 108 of training examples (i.e., a set of one or more training examples) from the training data 110 (as described further with reference to step 302 in FIG. 3). For example, the system 100 may randomly sample the mini-batch of training examples from the training data 110.

A posterior sampling engine 102 samples a temporary network parameter value 104 for each network parameter of the neural network 124 in accordance with the current posterior distribution parameters values for the network parameter (as described further with reference to 402). For example, the system 100 may sample a respective temporary network parameter value 104 for each network parameter by sampling from a probability distribution (e.g., a Gaussian distribution) having a mean and a standard deviation defined by the current posterior distribution parameter values for the network parameter.

The system 100 provides the temporary network parameter values 104 as input to a temporary gradient engine 106. The temporary gradient engine 106 is configured to determine a respective temporary gradient value 112 for each network parameter of the neural network 124 by determining a gradient of an objective function 128 for the mini-batch 108 with respect to the respective temporary parameter values 104 (as described further with reference to 404).

Figure 4:
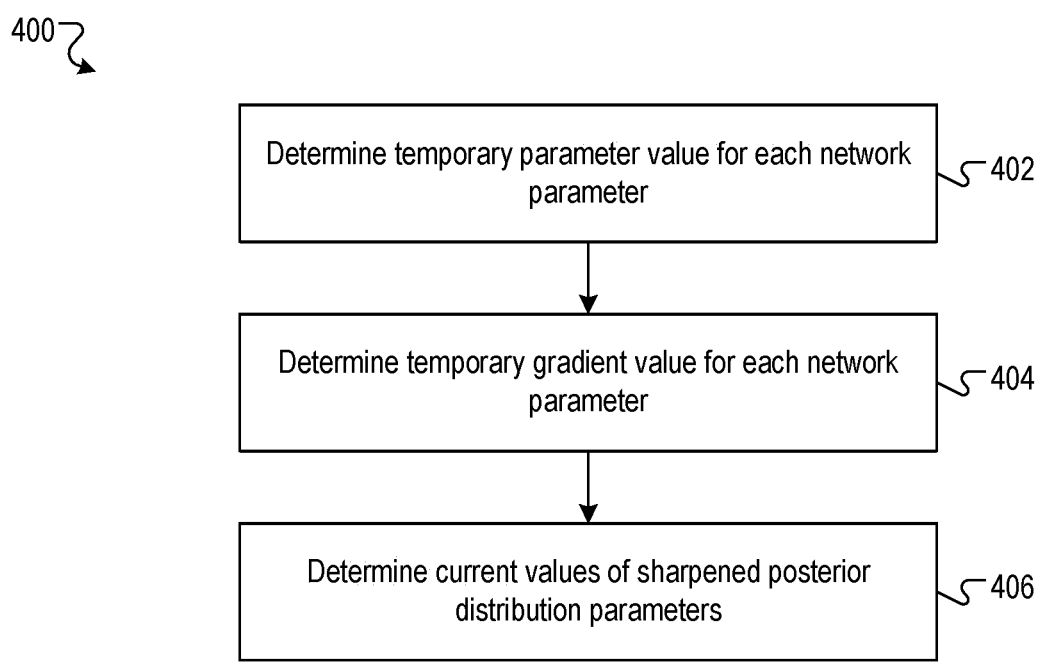
FIG. 4 is a flow diagram of an example process for determining a sharpened posterior distribution.

The system 100 determines the current values of the sharpened posterior distribution parameters based on the temporary network parameter values 104, the temporary gradient values 112, and the current values of the posterior distribution parameters (specifically, the learning rate parameters included in the posterior distribution parameters) (as described further with reference to step 406 in FIG. 4).

A sharpened posterior sampling engine 116 samples a training network parameter value 118 for each network parameter of the neural network 124 in accordance with the current values of the sharpened posterior distribution parameters for the network parameter (as described further with reference to 502). For example, the sharpened posterior sampling engine 116 may sample a respective training network parameter value 118 for each network parameter of the neural network 124 by sampling from a probability distribution (e.g., a Gaussian distribution) having a mean and a standard deviation defined by the current values of sharpened posterior distribution parameters for the network parameter.

The system 100 provides the training network parameter values 118 as input to a training gradient engine 122. The training gradient engine 122 is configured to determine a respective training gradient value 120 for each posterior distribution parameter (e.g., each mean parameter, standard deviation parameter, and learning rate parameter for each network parameter of the neural network 124) by determining gradients of an augmented objective function 130 for the mini-batch 108 with respect to the respective posterior distribution parameter values (as described further with reference to step 504 in FIG. 5). The augmented objective function 130 may include a term that is derived from the objective function 128, and terms that are derived from divergences (i.e., measures of difference) between: (i) the sharpened posterior distribution 126 and a prior distribution for the sharpened posterior distribution, and (ii) the posterior distribution 114 and a prior distribution for the posterior distribution.

The system 100 adjusts the current parameter values of the posterior distribution 114 based on the training gradient values 120 (as described further with reference to step 506 of FIG. 5), and determines whether the training is complete. In response to determining that the training is not complete, the system performs another training iteration.

Unlike the posterior distribution 114, the sharpened posterior distribution 126 depends on the mini-batch 108 for the current training iteration. Therefore, the neural network 124 may achieve better performance (i.e., relative to the objective function 128, the augmented objective function 130, or both) by processing the network inputs of the training examples included in the mini-batch 108 in accordance with the training network parameter values 118 (sampled from the sharpened posterior distribution 126) than it would by processing them in accordance with the temporary network parameter values 104 (sampled from the posterior distribution 114). Therefore, the training gradient values 120 (that are based on the training network parameter values 118) may provide updates for the current parameter values of the posterior distribution 114 that are more stable than would be achieved by using the temporary gradient values 112 (that are based on the temporary network parameter values 104). Updates to the parameter values of the posterior distribution 114 are referred to as stable if they consistently result in effective performance (e.g., prediction accuracy) of a neural network 124 with network parameter values that are selected based on the trained values of the posterior distribution parameters (as described earlier).

Figure 2:
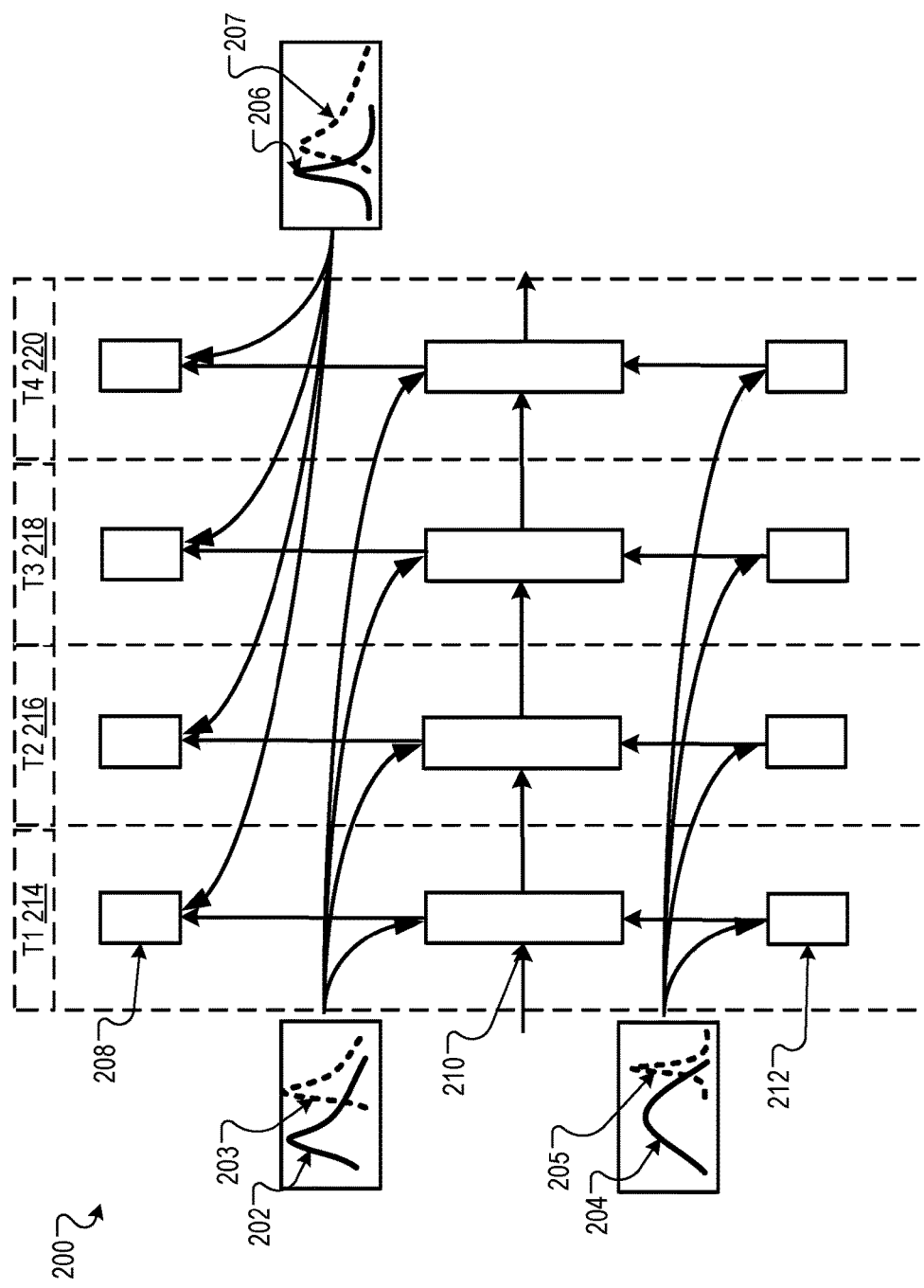
FIG. 2 shows an example neural network where the parameter values are defined by probability distributions.

FIG. 2 shows an example neural network 200 where the parameter values are characterized by probability distributions. Specifically, the neural network 200 is a recurrent neural network. It is depicted as "unrolled" over multiple time steps (i.e., 214, 216, 218, 220). Unrolling a recurrent neural network refers to representing the recurrent neural network as an equivalent sequence of feed-forward neural networks. The neural network 200 includes one or more encoding layers 212, one or more core layers 210, and one or more decoding layers 208.

If the system 100 trains the neural network 200 (i.e. if the neural network 200 is used as the neural network 124 of FIG. 1), then the system 100 maintains data specifying a posterior distribution over the values of the network parameters of the neural network 200. The posterior distribution may define a distribution 204 over the network parameters of the encoding layers 212, a distribution 202 over the network parameters of the core layers 210, and a distribution 206 over the network parameters of the decoding layers 208. Moreover, at each training iteration, the system 100 determines a sharpened posterior distribution over the values of the network parameters of the neural network 200. The sharpened posterior distribution may define a distribution 205 over the network parameters of the encoding layers 212, a distribution 203 over the network parameters of the core layers 210, and a distribution 207 over the network parameters of the decoding layers 208.

Once the system 100 finishes training the neural network 200, the system 100 can determine the trained values of the network parameters of the neural network 200 from the posterior distribution. For example, the system 100 can sample the trained values of the network parameters of the encoding layers 212 from the distribution 204, the trained values of the network parameters of the core layers 210 from the distribution 202, and the trained values of the network parameters of the decoding layers 208 from the distribution 206.

Although the probability distributions 202, 203, 204, 205, 206, and 207 are depicted for convenience as one-dimensional probability distributions, in general, they are probability distributions over respective multi-dimensional (e.g. high-dimensional) spaces.

Figure 3:
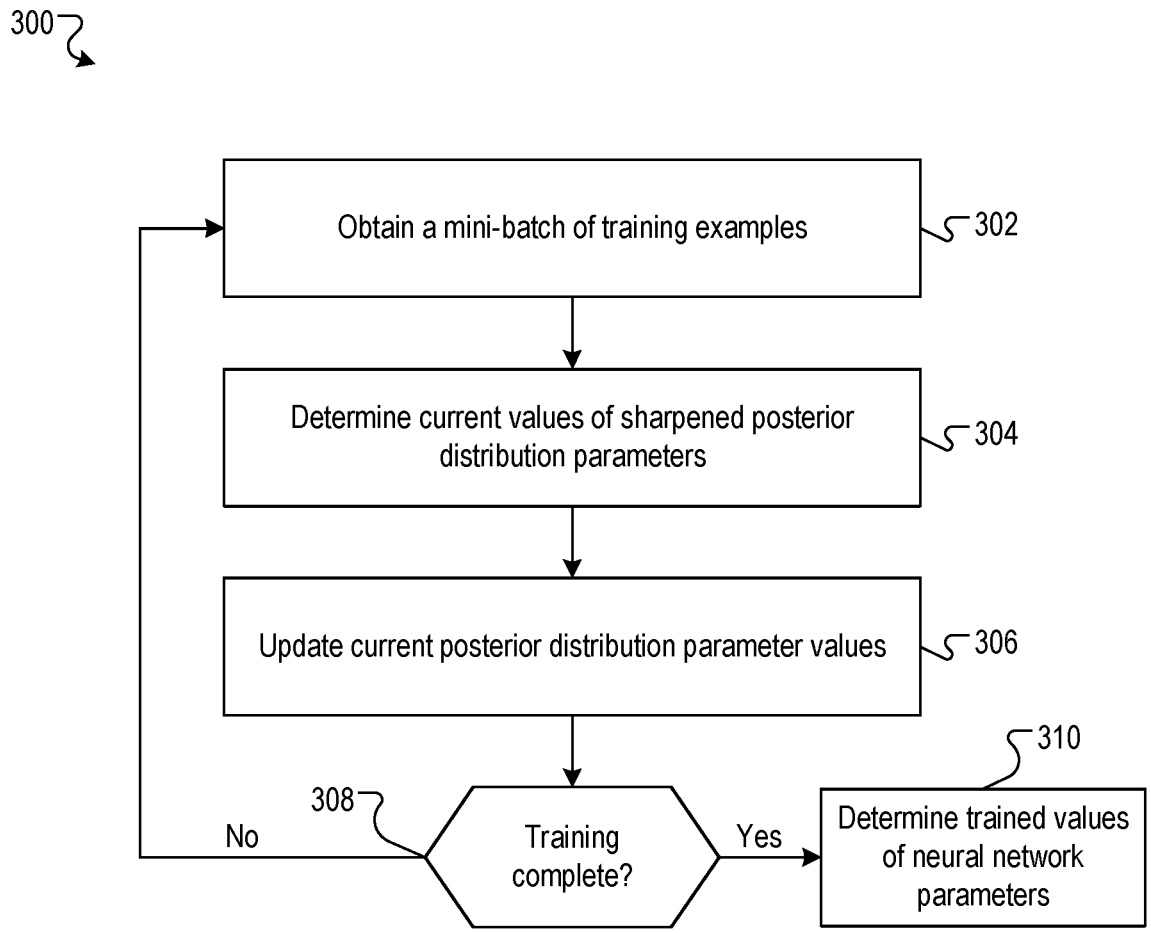
FIG. 3 is a flow diagram of an example process for training a neural network.

FIG. 3 is a flow diagram of an example process for training a neural network. The process 300 is performed at each of multiple training iterations to train the neural network. For convenience, the process 300 will be described as being performed by a system of one or more computers located in one or more locations. For example, a training system, e.g., the training system 100 of FIG. 1, appropriately programmed in accordance with this specification, can perform the process 300.

The system obtains a mini-batch of training examples (i.e., a set of one or more training examples) from the training data (302). For example, the system may randomly sample the mini-batch of training examples from the training data.

When the neural network is a feed-forward neural network, each training example includes a network input and a corresponding target output. When the neural network is a recurrent neural network, each training example includes a sequence of network inputs and corresponding target outputs. In some cases (e.g., for reasons of computational efficiency during training), for each training example, the sequence of network inputs and corresponding target outputs included in the training example is a truncation (i.e., a subsequence) of a longer sequence of network inputs and corresponding target outputs. The system may obtain the mini-batch of training examples by sampling randomly from the training examples of the training data.

The system determines current values of sharpened posterior distribution parameters of a sharpened posterior distribution, as described with reference to FIG. 4 (304). More specifically, the system samples temporary network parameter values for each network parameter of the neural network from a posterior distribution, and determines a temporary gradient value for each network parameter by computing a gradient of an objective function for the mini-batch with respect to the temporary network parameter values. The system determines the current values of the sharpened posterior distribution parameters based on the temporary network parameter values, the temporary gradient values, and the current values of the posterior distribution parameters.

The system updates the current values of the posterior distribution parameters, as described with reference to FIG. 5 (306). More specifically, the system determines a training parameter value for each network parameter of the neural network by sampling from the sharpened posterior distribution, and determines a training gradient value for each posterior distribution parameter by computing a gradient of an augmented objective function for the mini-batch with respect to the posterior distribution parameter values. The system updates the current values of the posterior distribution parameters based on the training gradient values.

The system determines whether the training is complete (308). In some cases, the system determines the training to be complete if a predetermined number of training iterations are complete. In some cases, the system determines the training to be complete if the values of the parameters of the posterior distribution have converged (e.g., if a measure of the change in the values of the parameters of the parameters of the posterior distribution between iterations falls below a predetermined threshold).

In response to determining that the training is not complete, the system returns to 302 and performs another training iteration by repeating the preceding steps. In this way, the set of steps 302-306 is performed at least once, and more typically a plurality of times using different respective mini-batches of training examples.

In response to determining that the training is complete, the system determines the trained values of the network parameters of the neural network from the posterior distribution. In some implementations, for each network parameter, the system determines the trained value of the network parameter to be a mean of the posterior distribution over possible values of the network parameter. In some other implementations, the system samples multiple respective candidate sets of values for the network parameters from the posterior distribution. For each candidate set of network parameter values, the system may determine an effectiveness (e.g., a prediction accuracy) of the neural network when it processes network inputs to determine network outputs in accordance with the candidate set of network parameter values. Finally, the system may determine the trained values of the network parameters to be the candidate set of network parameter values that cause the neural network to be most effective.

In some cases, once the training is complete and the system has determined the trained values of the network parameters, the system may store the trained values of the network parameters (e.g., in a logical data storage area or on a physical data storage device). In some cases, once the training is complete and the system has determined the trained values of the network parameters, the system provides the trained values of the network parameters for use in processing network inputs using the trained neural network.

FIG. 4 is a flow diagram of an example process (corresponding to step 304 of FIG. 3) for determining a sharpened posterior distribution. For convenience, the process 400 will be described as being performed by a system of one or more computers located in one or more locations. For example, a training system, e.g., the training system 100 of FIG. 1, appropriately programmed in accordance with this specification, can perform the process 400.

The system determines a temporary parameter value for each network parameter of the neural network by sampling from a posterior distribution (402). The posterior distribution (which corresponds to the probability distribution 114) is a probability distribution over possible values for each of the network parameters of the neural network. The posterior distribution is defined by current values of posterior distribution parameters. The posterior distribution parameters include, for each network parameter of the neural network, respective posterior distribution parameters that define a probability distribution over possible values for the network parameter. For example, the respective posterior distribution parameters for each network parameter may include a mean parameter and a standard deviation parameter. The posterior distribution parameters also include, for each network parameter, a learning rate parameter.

The system samples a temporary network parameter value for each network parameter of the neural network in accordance with the current posterior distribution parameter values for the network parameter. For example, the system may sample a respective temporary network parameter value for each network parameter by sampling from a probability distribution (e.g., a Gaussian distribution) having a mean and a standard deviation defined by the current posterior distribution parameter values for the network parameter.

The system determines a temporary gradient value for each network parameter of the neural network (404). Specifically, the system determines a gradient of an objective function for the mini-batch (i.e., as obtained in 302) with respect to the respective temporary network parameter values (i.e., as determined in 402). In general, the objective function is based on a similarity of the network outputs generated by the neural network for the network inputs of the training examples included in the current mini-batch and the corresponding target outputs. The objective function may be a cross-entropy objective function, a mean-squared-error (MSE) objective function, or any other appropriate objective function.

In some implementations (e.g., when the neural network is a feed-forward neural network), the system determines the temporary gradient value for each network parameter by performing an iteration of a stochastic gradient descent with backpropagation training procedure on the mini-batch with the values of the network parameters set to the temporary network parameter values. In some implementations (e.g., when the neural network is a recurrent neural network), the system determines the temporary gradient value for each network parameter by performing an iteration of a backpropagation-through-time training procedure on the mini-batch with the values of the network parameters set to the temporary network parameter values. In some implementations (e.g., when the neural network is a recurrent neural network and the training examples in the mini-batch include truncated sequences of network inputs), the system determines the temporary gradient value for each network parameter by performing an iteration of a truncated backpropagation-through-time training procedure on the mini-batch with the values of the network parameters set to the temporary network parameter values.

The system determines current values of sharpened posterior distribution parameters of a sharpened posterior distribution (406). Similar to the posterior distribution, the sharpened posterior distribution is a probability distribution over possible values for each of the network parameters of the neural network. The sharpened posterior distribution is defined by the current values of sharpened posterior distribution parameters. The sharpened posterior distribution parameters include, for each network parameter of the neural network, respective sharpened posterior distribution parameters that define a probability distribution over possible values for the network parameter. For example, the respective sharpened posterior distribution parameters for each network parameter may include a mean parameter and a standard deviation parameter.

In general, the system determines the current values of the sharpened posterior distribution parameters based on the temporary network parameter values (i.e., as determined in 402), the temporary gradient values (i.e., as determined in 404), and the current values of the posterior distribution parameters (specifically, the learning rate parameters for the network parameters).

For example, when the respective sharpened posterior distribution parameters for each network parameter include a mean parameter, the system may determine the current value of the mean parameter for each respective network parameter by:

$$\theta_\mu = \phi - \eta \cdot g_\phi,$$

where $\theta_\mu$ is the mean parameter for the network parameter, $\phi$ is the temporary parameter value of the network parameter, $\eta$ is the learning rate parameter for the network parameter (i.e., as defined by the posterior distribution parameters), and $g_\phi$ is the temporary gradient value for the network parameter. In some cases, the value of the learning rate parameter $\eta$ may be fixed at 0.

As another example, when the respective sharpened posterior distribution parameters for each network parameter include a standard deviation parameter, the system may determine the current value of the standard deviation parameter for each respective network parameter to be a fixed positive value (which may be determined, e.g., by cross-validation).

Figure 5:
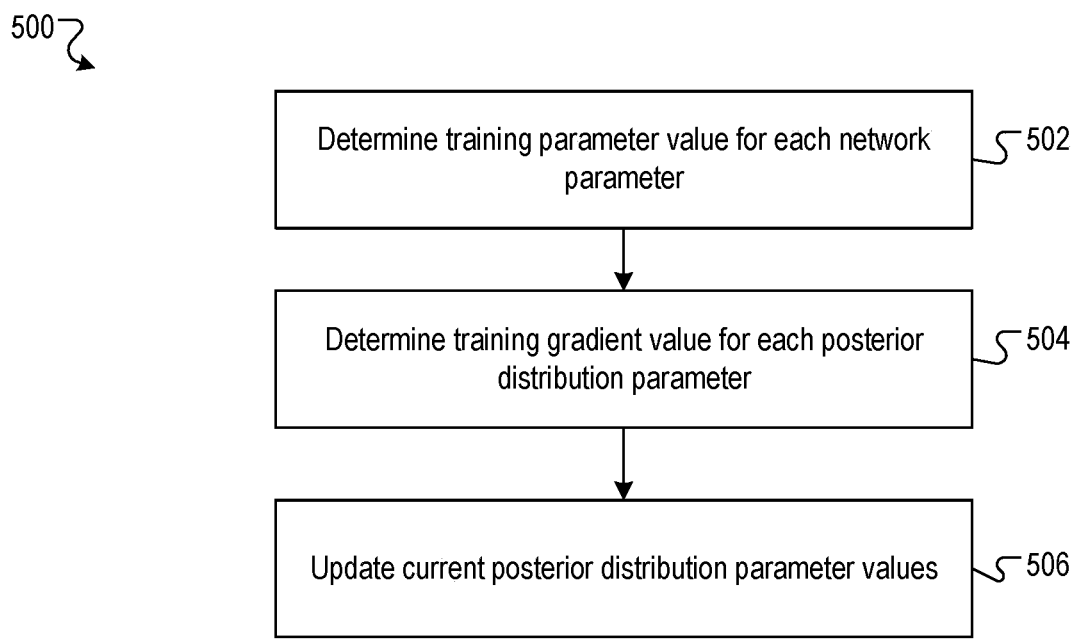
FIG. 5 is a flow diagram of an example process for updating a posterior distribution.

FIG. 5 is a flow diagram of an example process (corresponding to step 306 of FIG. 3) for updating a posterior distribution, such as the posterior distribution 114. For convenience, the process 500 will be described as being performed by a system of one or more computers located in one or more locations. For example, a training system, e.g., the training system 100 of FIG. 1, appropriately programmed in accordance with this specification, can perform the process 500.

The system determines a training parameter value 118 for each network parameter of the neural network by sampling from the sharpened posterior distribution 126 (502). Specifically, the system samples a training network parameter value for each network parameter of the neural network in accordance with the current sharpened posterior distribution parameter values for the network parameter (i.e., as determined in 406). For example, the system may sample a respective training network parameter value for each network parameter by sampling from a probability distribution (e.g., a Gaussian distribution) having a mean and a standard deviation defined by the current sharpened posterior distribution parameter values for the network parameter.

The system determines a training gradient value for each posterior distribution parameter (e.g., the mean parameter, standard deviation parameter, and learning rate parameter for each network parameter of the neural network) (504). Specifically, the system determines a gradient of an augmented objective function for the mini-batch (i.e., as obtained in 302) with respect to the respective posterior distribution parameter values. The augmented objective function may include a term that is derived from the objective function, and terms that are derived from divergences (i.e., measures of difference) between: (i) the sharpened posterior distribution and a prior distribution for the sharpened posterior distribution, and (ii) the posterior distribution and a prior distribution for the posterior distribution. For example, the augmented objective function $\mathcal{L}_{aug}$ may be given by:

$$\mathcal{L}_{aug} = \mathcal{L} + KL[q(\theta \mid \phi, (x, y)) \mid p(\theta \mid \phi)] + \frac{1}{C}KL[q(\phi) \mid p(\phi)],$$

where $\mathcal{L}$ is the objective function, KL denotes the Kullback-Leibler divergence measure (i.e., a measure of similarity between probability distributions), $q(\theta|\phi(x, y))$ denotes the sharpened posterior distribution, $p(\theta|\phi)$ denotes a prior distribution for the sharpened posterior distribution, $q(\phi)$ denotes the posterior distribution, $p(\phi)$ denotes the prior distribution for the posterior distribution, and C denotes the number of training examples in the current mini-batch (i.e., as obtained in 302). The prior distributions (i.e., for the sharpened posterior distribution and the posterior distribution) can have any appropriate form. For example, the prior distributions may be Gaussian mixture models (i.e., probability distributions given by combinations of multiple Gaussian distributions).

In some implementations, B can represent the number of mini-batches and C can represent the number of training examples in the current mini-batch. We can write the objective function as:

$$\mathcal{L}(\theta) = -E_{q(\theta)}\left[\log \prod_{b=1}^{B} \prod_{c=1}^{C} p(y^{(b,c)} \mid \theta, x^{(b,c)})\right] + KL[q(\theta)\|p(\theta)],$$

where the (b, c) superscript denotes elements of cth training example in the bth minibatch. Thus the objective function of mini-batch b of a training example c can be written as:

$$\mathcal{L}_{(b,c)}(\theta) = -E_{q(\theta)}\left[\log p(y^{(b,c)} \mid \theta, x^{(b,c)}, s_{prev}^{(b,c)})\right] + w_{KL}^{(b,c)} KL[q(\theta)\|p(\theta)],$$

where $w_{KL}^{(b,c)}$ distributes the responsibility of the KL cost among mini-batches and training examples in each mini-batch (thus $$\sum_{b=1}^{B} \sum_{c=1}^{C} w_{KL}^{(b,c)} = 1$$

and $s_{prev}^{(b,c)}$ refers to the initial state of the recurrent neural network for the mini-batch $x^{(b,c)}$. In practice, $$w_{KL}^{(b,c)} = \frac{1}{BC}$$

so that the KL penalty is equally distributed among all mini-batches and training examples in the mini-batch. The training example in each subsequent mini-batches are picked in order, and so $s_{prev}^{(b,c)}$ is set to the last state of the recurrent neural network for $x^{b,c-1}$. The question of when to sample weights follows naturally from taking a Monte Carlo approximations to the objective function of mini-batch b of a training example c: for each mini-batch, sample a fresh set of parameters.

For example, the system can follow the algorithm:
Sample $\varepsilon \sim N(0,I)$, $\varepsilon \in \mathbb{R}^d$.
Set network parameters to $\theta = \mu + \sigma\varepsilon$.
Sample a mini-batch of training examples (x,y).
Do forward propagation and backpropagation as normal on a minibatch.
Let g be the gradient with respect to $\theta$ from backpropagation.
Let $g_\theta^{KL}$, $g_\sigma^{KL}$, $g_\mu^{KL}$ be the gradients of log N $(\theta|\mu, \sigma)$ —log $p(\theta)$ with respect to $\theta$, $\mu$ and $\sigma$ respectively.
Update $\mu$ according to the gradient $$\frac{g + \frac{1}{C}g_\theta^{KL}}{B} + \frac{g_\mu^{KL}}{BC}.$$

Update $\sigma$ according to the gradient $$\left(\frac{g + \frac{1}{C}g_\theta^{KL}}{B}\right)\varepsilon + \frac{g_\sigma^{KL}}{BC}.$$

In some implementations (e.g., when the neural network is a feed-forward neural network), the system determines the training gradient value for each posterior distribution parameter by performing an iteration of a stochastic gradient descent with backpropagation training procedure on the mini-batch with the values of the network parameters set to the training network parameter values (i.e., as determined in 502). In some implementations (e.g., when the neural network is a recurrent neural network), the system determines the training gradient value for each posterior distribution parameter by performing an iteration of a backpropagation-through-time training procedure on the mini-batch with the values of the network parameters set to the training network parameter values (i.e., as determined in 502). In some implementations (e.g., when the neural network is a recurrent neural network and the training examples in the mini-batch include truncated sequences of network inputs, as described earlier), the system determines the training gradient value for each posterior distribution parameter by performing an iteration of a truncated backpropagation-through-time training procedure on the mini-batch with the values of the network parameters set to the training network parameter values (i.e., as determined in 502).

The system updates the current values of the posterior distribution parameters based on the training gradient values (506). For example, the system may update the current values of the mean parameter, standard deviation parameter, and learning rate parameter for each network parameter of the neural network based on the training gradient values. For each posterior distribution parameter $\alpha$, the system may update the current value of the posterior distribution parameter by:

$$\alpha \leftarrow \alpha - r g_\alpha,$$

where r is a scaling parameter (e.g., determined arbitrarily or by cross-validation) and $g_\alpha$ is the training gradient value for the posterior distribution parameter $\alpha$.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a recurrent neural network having a plurality of network parameters to determine trained values of the network parameters,
    wherein the recurrent neural network is configured to receive a network input and to process the network input in accordance with the network parameters to generate a network output,
    wherein the network input comprises a sequence that includes a respective time step input at each of a plurality of time steps, and
    wherein the method comprises:
    at each training iteration of a plurality of training iterations:
        maintaining data specifying, for each of the network parameters, current values of a respective set of posterior distribution parameters that define a posterior probability distribution over possible values for the network parameter;
        determining a respective temporary parameter value for each of the network parameters from the current values of the respective set of posterior distribution parameters for the network parameter;
        obtaining a mini-batch comprising a plurality of training network inputs and, for each training network input, a respective training network output;
        determining a respective temporary gradient value for each of the network parameters by determining a gradient of an objective function for the mini-batch and with respect to the respective temporary parameter values, comprising:
            performing an iteration of a backpropagation through time training procedure on the mini-batch with the values of the network parameters set to the temporary parameter values;
        updating the current values of the respective sets of posterior distribution parameters for the network parameters based at least in part on the temporary gradient values for the network parameters that are determined using the backpropagation through time training procedure comprising:

determining gradients of a measure of difference between the temporary parameter values under the posterior probability distribution and under a prior probability distribution with respect to the respective sets of posterior distribution parameters for the network parameters; and determining an update to the current values of the respective sets of posterior distribution parameters for the network parameters as a combination of the temporary gradient values and the gradients of the measure of difference comprising:

scaling the temporary gradient values and the gradients of the measure of difference by respective scaling factors based on a product between: (i) a number of training network inputs in the mini-batch, and (ii) a number of mini-batches used during the training of the recurrent neural network; and determining the trained values of the network parameters based on the updated current values of the respective sets of posterior distribution parameters.

2. The method of claim 1, wherein the measure of difference between the temporary parameter values is a Kullback-Leibler divergence measure.

3. The method of claim 1, wherein the set of posterior distribution parameters that define a posterior probability distribution comprise (i) a mean parameter, (ii) a standard deviation parameter, and (iii) a learning rate parameter for the network parameter.

4. The method of claim 1, wherein obtaining a mini-batch comprising a plurality of training network inputs and, for each training network input, a respective training network output comprises:

obtaining the mini-batch by sampling randomly from the training examples of the training data.

5. The method of claim 1, wherein the training network inputs in the mini-batch are truncated network inputs, and wherein the backpropagation through time training procedure is a truncated backpropagation through time training procedure.

6. The method of claim 1, wherein updating the current values of the respective sets of posterior distribution parameters for the network parameters based at least in part on the temporary gradient values for the network parameters that are determined using the backpropagation through time training procedure comprises:

determining a respective current training value for each of the network parameters from the respective temporary gradient value for the network parameter; and updating the current values of the respective sets of posterior distribution parameters for the network parameters in accordance with the respective current training values for the network parameters.

7. The method of claim 6, wherein determining a respective current training value for each of the network parameters from the respective temporary gradient value for the network parameter comprises, for each network parameter:

determining respective values of one or more sharpened posterior distribution parameters that define a sharpened posterior probability distribution over possible values of the network parameter based on at least the respective temporary gradient value for the network parameter; and sampling the current training value for the network parameter in accordance with the sharpened posterior probability distribution.

8. The method of claim 1, wherein the posterior distribution parameters include a mean parameter and a standard deviation parameter for each of the network parameters, and wherein determining a respective temporary parameter value for each of the network parameters from the current values of the set of posterior distribution parameters for the network parameter comprises:

sampling the temporary parameter value from the posterior probability distribution for the network parameter, wherein the mean of the posterior probability distribution for the network parameter is defined by the current value of the mean parameter for the network parameter and the standard deviation of the posterior probability distribution for the network parameter is defined by the current value of the standard deviation parameter for the network parameter.

9. A system comprising:
one or more computers; and
one or more storage devices communicatively coupled to the one or more computers, wherein the one or more storage devices store instructions that, when executed by the one or more computers, cause the one or more computers to perform operations for training a recurrent neural network having a plurality of network parameters to determine trained values of the network parameters, wherein the recurrent neural network is configured to receive a network input and to process the network input in accordance with the network parameters to generate a network output, wherein the network input comprises a sequence that includes a respective time step input at each of a plurality of time steps, and wherein the operations comprise:
at each training iteration of a plurality of training iterations:

maintaining data specifying, for each of the network parameters, current values of a respective set of posterior distribution parameters that define a posterior probability distribution over possible values for the network parameter;

determining a respective temporary parameter value for each of the network parameters from the current values of the respective set of posterior distribution parameters for the network parameter;

obtaining a mini-batch comprising a plurality of training network inputs and, for each training network input, a respective training network output;

determining a respective temporary gradient value for each of the network parameters by determining a gradient of an objective function for the mini-batch and with respect to the respective temporary parameter values, comprising:

performing an iteration of a backpropagation through time training procedure with the values of the network parameters set to the temporary parameter values;

updating the current values of the respective sets of posterior distribution parameters for the network parameters based at least in part on the temporary gradient values for the network parameters that are determined using the backpropagation through time training procedure comprising:

determining gradients of a measure of difference between the temporary parameter values under the posterior probability distribution and under a prior probability distribution with respect to the respective sets of posterior distribution parameters for the network parameters; and determining an update to the current values of the respective sets of posterior distribution parameters for the network parameters as a combination of the temporary gradient values and the gradients of the measure of difference comprising:

scaling the temporary gradient values and the gradients of the measure of difference by respective scaling factors based on a product between: (i) a number of training network inputs in the mini-batch, and (ii) a number of mini-batches used during the training of the recurrent neural network; and determining the trained values of the network parameters based on the updated current values of the respective sets of posterior distribution parameters.

10. The system of claim 9, wherein the measure of difference between the temporary parameter values is a Kullback-Leibler divergence measure.

11. The system of claim 9, wherein the set of posterior distribution parameters that define a posterior probability distribution comprise (i) a mean parameter, (ii) a standard deviation parameter, and (iii) a learning rate parameter for the network parameter.

12. The system of claim 9, wherein obtaining a mini-batch comprising a plurality of training network inputs and, for each training network input, a respective training network output comprises:

obtaining the mini-batch by sampling randomly from the training examples of the training data.

13. The system of claim 9, wherein the training network inputs in the mini-batch are truncated network inputs, and wherein the backpropagation through time training procedure is a truncated backpropagation through time training procedure.

14. The system of claim 9, wherein updating the current values of the respective sets of posterior distribution parameters for the network parameters based at least in part on the temporary gradient values for the network parameters that are determined using the backpropagation through time training procedure comprises:

determining a respective current training value for each of the network parameters from the respective temporary gradient value for the network parameter; and updating the current values of the respective sets of posterior distribution parameters for the network parameters in accordance with the respective current training values for the network parameters.

15. The system of claim 14, wherein determining a respective current training value for each of the network parameters from the respective temporary gradient value for the network parameter comprises, for each network parameter:

determining respective values of one or more sharpened posterior distribution parameters that define a sharpened posterior probability distribution over possible values of the network parameter based on at least the respective temporary gradient value for the network parameter; and sampling the current training value for the network parameter in accordance with the sharpened posterior probability distribution.

16. The system of claim 9, wherein the posterior distribution parameters include a mean parameter and a standard deviation parameter for each of the network parameters, and wherein determining a respective temporary parameter value for each of the network parameters from the current values of the set of posterior distribution parameters for the network parameter comprises:

sampling the temporary parameter value from the posterior probability distribution for the network parameter, wherein the mean of the posterior probability distribution for the network parameter is defined by the current value of the mean parameter for the network parameter and the standard deviation of the posterior probability distribution for the network parameter is defined by the current value of the standard deviation parameter for the network parameter.

17. One or more non-transitory computer storage media storing instructions that when executed by one or more computers cause the one or more computers to perform operations for training a recurrent neural network having a plurality of network parameters to determine trained values of the network parameters, wherein the recurrent neural network is configured to receive a network input and to process the network input in accordance with the network parameters to generate a network output, wherein the network input comprises a sequence that includes a respective time step input at each of a plurality of time steps, and wherein the operations comprise:

at each training iteration of a plurality of training iterations:

maintaining data specifying, for each of the network parameters, current values of a respective set of posterior distribution parameters that define a posterior probability distribution over possible values for the network parameter;

determining a respective temporary parameter value for each of the network parameters from the current values of the respective set of posterior distribution parameters for the network parameter;

obtaining a mini-batch comprising a plurality of training network inputs and, for each training network input, a respective training network output;

determining a respective temporary gradient value for each of the network parameters by determining a gradient of an objective function for the mini-batch and with respect to the respective temporary parameter values, comprising:

performing an iteration of a backpropagation through time training procedure with the values of the network parameters set to the temporary parameter values;

updating the current values of the respective sets of posterior distribution parameters for the network parameters based at least in part on the temporary gradient values for the network parameters that are determined using the backpropagation through time training procedure comprising:

determining gradients of a measure of difference between the temporary parameter values under the posterior probability distribution and under a prior probability distribution with respect to the respective sets of posterior distribution parameters for the network parameters; and determining an update to the current values of the respective sets of posterior distribution parameters for the network parameters as a combination of the temporary gradient values and the gradients of the measure of difference comprising:

scaling the temporary gradient values and the gradients of the measure of difference by respective scaling factors based on a product between: (i) a number of training network inputs in the mini-batch, and (ii) a number of mini-batches used during the training of the recurrent neural network; and determining the trained values of the network parameters based on the updated current values of the respective sets of posterior distribution parameters.

18. The non-transitory computer storage media of claim 17, wherein the measure of difference between the temporary parameter values is a Kullback-Leibler divergence measure.

19. The non-transitory computer storage media of claim 17, wherein the set of posterior distribution parameters that define a posterior probability distribution comprise (i) a mean parameter, (ii) a standard deviation parameter, and (iii) a learning rate parameter for the network parameter.

20. The non-transitory computer storage media of claim 17, wherein obtaining a mini-batch comprising a plurality of training network inputs and, for each training network input, a respective training network output comprises:

obtaining the mini-batch by sampling randomly from the training examples of the training data.

* * * * *